Inventor
Harry M. Ellerkamp

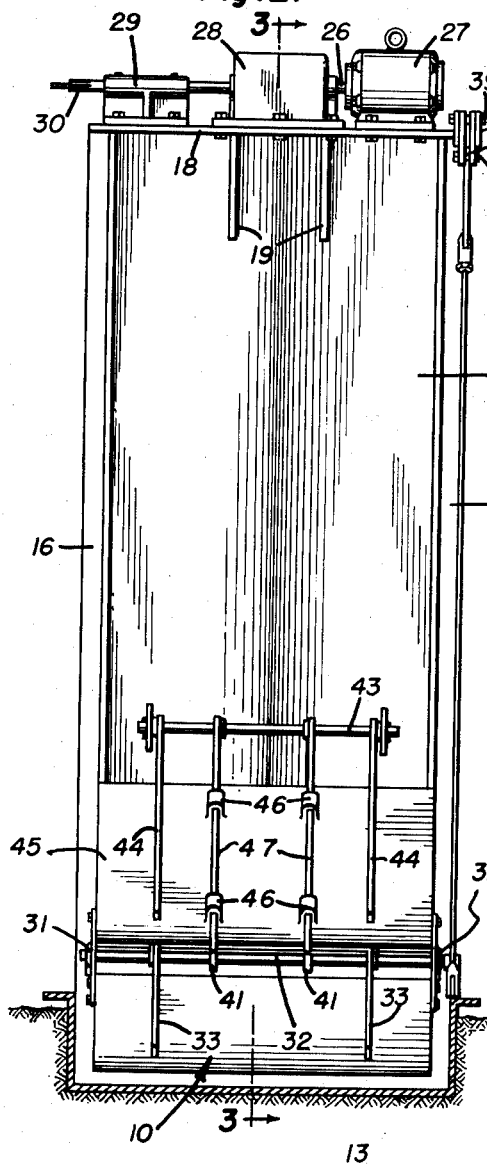
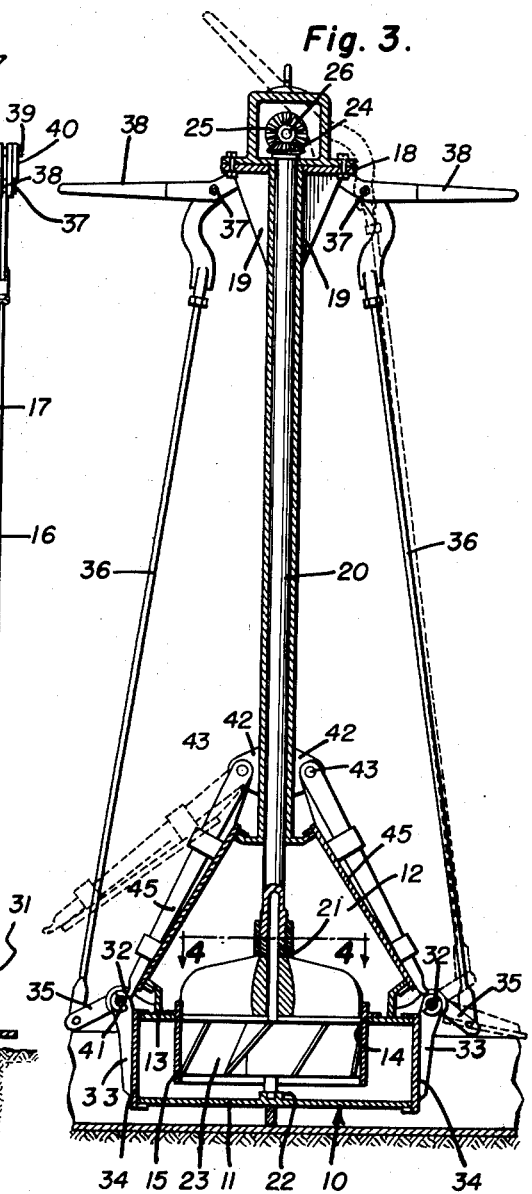
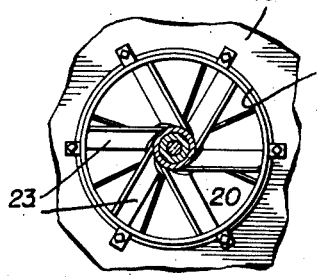

Patented June 20, 1950

2,512,420

UNITED STATES PATENT OFFICE 2,512,420

REVERSIBLE IRRIGATION PUMP

Harry M. Ellerkamp, Fort Lauderdale, Fla.

Application December 23, 1946, Serial No. 718,089

5 Claims. (Cl. 61—12)

This invention relates to a reversible irrigation pump and has for its primary object to pump water from an irrigation canal to a field to be irrigated, or from a flooded field to a canal depending on the condition of the adjacent fields.

Another object of the invention is to control the relative levels of separate bodies of water or to maintain a higher water level on one side of the pump than on the other.

A further object is to reverse the flow of water through the pump without reversing the direction of movement of the water pumping elements.

The above and other objects may be attained by employing this invention which embodies among its features a casing having a flow passage which aligns longitudinally with an irrigation canal, means in the flow passage to deliver fluid entering the lower portion thereof into the upper portion thereof and gates on the casing at opposite ends of the flow passage for regulating the direction in which fluid flows through the pump.

Other features include an upper gate and a lower gate at each end of the flow passage, means selectively to open the lower gates at the opposite ends of the flow passage and means operating in unison with the opening of a lower gate to hold the adjacent upper gate in closed position.

In the drawings:

Figure 2 is an end view of the pump showing the same seated in an irrigation canal;

Figure 3 is a vertical sectional view taken substantially along the line 3—3 of Figure 2;

Figure 4 is a horizontal sectional view taken substantially along the line 4—4 of Figure 3.

Figures 1, 5:
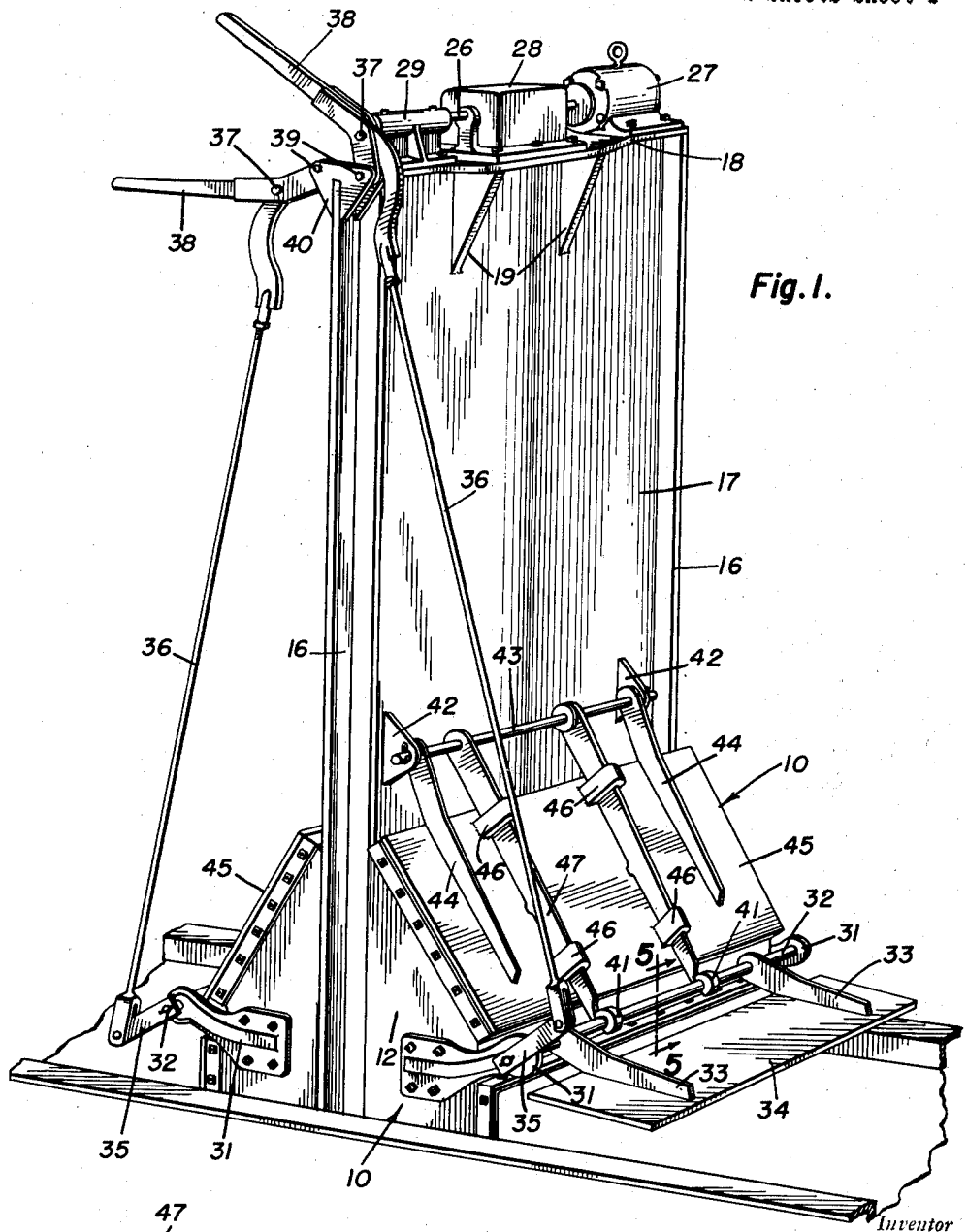
Figure 1 is a perspective view of an irrigation pump embodying the features of this invention.
Figure 5 is a fragmentary enlarged detail view taken substantially on the line 5—5 of Figure 1.

Referring to the drawings in detail, this improved irrigation pump comprises a casing designated generally 10 having a bottom wall 11 and upwardly extending side walls 12, the side edges of which converge as will be readily understood upon reference to the drawings. The lower portions of the side edges of the side walls are parallel and extending across the casing. At the junction of the parallel portions of the side walls with the convergent portions thereof is a horizontal partition wall 13 having a central opening 14 in which is seated a tubular housing 15 the purpose of which will be more fully hereinafter described. The partition wall 13 separates the pump casing 10 into a lower chamber of substantially rectangular formation while the upper portion of the casing defined by the side walls and the convergent edges thereof constitutes an upper chamber which communicates with the lower chamber through the opening 14 and tubular housing 15 which projects downwardly into the lower chamber as will be readily understood upon reference to Figure 3.

Rising from the upper ends of the side walls 12 are standards or columns 16 between which a web 17 extends, and the lower end of the web is coincidental with the upper edges of the side walls, while the upper end of the web is provided with a horizontally disposed flange or shelf 18 held against twisting by oppositely extending braces or angle brackets 19. Extending vertically between opposite sides of the web 17 from the shelf 18, and into the upper chamber of the pump casing is a tubular housing 20 in which a drive shaft 21 is mounted to rotate. The lower end of the drive shaft is journaled in a suitable bearing element 22 carried by the bottom wall 11 of the housing 10 and secured to the drive shaft near its lower end and for rotary motion within the tubular housing 15 is an impeller 23. The impeller 23 is provided with blades which extend outwardly therefrom and are so shaped that liquid entering the lower chamber will be elevated into the upper chamber when the impeller is rotated by the shaft 21.

In order to impart rotary motion to the shaft 21 a suitable pinion 24 is fixed to the upper end thereof and has meshing engagement with a pinion 25 which is keyed or otherwise secured to a drive shaft 26 which is coupled to a drive motor 27 in any conventional manner. The motor 27 is supported on the shelf 18, and the gears 24 and 25 are housed within a suitable gear case 28. As illustrated in Figure 2 the shaft 26 is extended through a suitable bearing 29 to a point slightly beyond one side of the pump and the end of the shaft is splined as at 30 to accommodate a power take-off sprocket or the like.

Rotatably mounted in suitable bearings 31 carried by the casing 10 at each end thereof is a rock shaft 32 to which are fixed spaced parallel arms 33. Welded or otherwise attached to the arms 33 at each end of the casing 10 is a gate 34 which is of sufficient area completely to close its respective end of the lower chamber of the casing 10. A lever 35 is fixed to one end of each rock shaft 32 and connected to said lever is a link 36 which extends upwardly and is coupled as at 37 to a hand lever 38. One end of each hand lever 38 is pivotally supported as at 39 in an angle bracket 40 carried by the upper end of one of the columns 16 and is so arranged that by moving it about its respective pivot 39, the gate 34 to which it is connected will be moved to open or closed position. As illustrated in Figure 3 the lever is so shaped, and the upper end of the respective link 36 is so formed that when the lever 38 is moved to elevate its respective gate 34 the pivots 37 and 40 will pass dead center, thus locking the gate 34 in elevated position. Welded or otherwise attached to each shaft 32 intermediate its ends are longitudinally spaced cams 41, the purpose of which will more fully hereinafter appear.

Projecting outwardly from the web 17 on opposite sides and in horizontally spaced relation are brackets 42 in which a supporting shaft 43 is mounted in any suitable manner. As illustrated each shaft 43 is spaced slightly above the upper end of the upper chamber of the housing 10 and mounted for rotation about the horizontal axis of each shaft 43 is a pair of spaced arms 44 to which a gate 45 is welded or otherwise fixed. Each gate 45 is adapted to engage the convergent edges of the side walls 12 and completely to cover the end openings of the upper chamber. Carried by each gate 45 are spaced loops 46, and extending through the loops are arms 47 which are mounted to rotate on the shaft 43 in unison with the gates. Each arm 47 is provided at its end opposite that which is pivotally supported on the shaft 43 with a finger 48 which as illustrated in Figures 1 and 5 is adapted to cooperate with a cam 41 previously described in holding its respective gate 45 closed when the adjacent gate 34 is moved to open position. It will thus be seen that water entering the pump through the opened gate 34 will be prevented from flowing out of the pump on the side on which the lower gate is opened.

In use, the pump is placed in an irrigation canal as suggested in Figures 1, 2 and 3 with the gates 34 and 45 forming a dam across the canal. Water flowing through the canal will encounter the pump and start to back up behind it. When it is desired to flood a local area one of the gates 34 is opened by manipulating its respective lever 38 and throwing it into the dotted line position illustrated in Figure 3, or in full line position illustrated in Figure 1. With the opening of the gate 34 the cams 41 will be rotated so that their ends will contact the fingers 48 of the levers 47 on the end of the pump on which the gate is opened with the result that the gate 45 on the same end of the pump will be locked in closed position. Upon applying electric energy to the motor 27 it will be obvious that the impeller 23 will be driven so as to extract the water from the lower chamber of the pump casing 10 and deliver it to the upper chamber. The water pressure thus built up in the upper chamber will cause the gate 45 at the opposite end of the pump to open and discharge the water from the pump over the area or field on the side of the pump opposite the open gate 34, thus enabling the area to be irrigated. It is obvious that the flow may be reversed almost instantaneously by closing the open gate 34 and opening the gate at the opposite end of the pump through the simple manipulation of the levers 38. The entire reversal may be accomplished in but a few moments of time as the impeller 23 is continuously rotated in the same direction irrespective of the flow established through the pump. The locking of the gates 45 in closed position is effected automatically upon the opening of the gate 34 on its respective side of the pump and hence changes in the operation of the device may be easily and quickly accomplished.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A reversible flow irrigation pump which includes a casing having a flow passage which aligns longitudinally with an irrigation canal, means in the flow passage to deliver fluid entering the lower portion thereof into the upper portion thereof, a lower gate mounted on the casing at each end of the flow passage to swing about a horizontal axis and open or close the lower portion of each end of the flow passage and a gravity closed upper gate mounted on the casing at each end of the flow passage to swing about a horizontal axis and open or close the upper portion of each end of the flow passage and means carried by each lower gate to engage an adjacent upper gate and hold said upper gate against opening.

2. A reversible flow irrigation pump which includes a casing having a flow passage which aligns longitudinally with an irrigation canal, means in the flow passage to deliver fluid entering the lower portion thereof into the upper portion thereof, an upper gate and a lower gate at each end of the flow passage for regulating the direction in which fluid flows through the pump and means carried by each lower gate and operable upon the opening thereof to hold an adjacent upper gate closed.

3. A reversible flow irrigation pump which includes a casing having a flow passage which aligns longitudinally with an irrigation canal, means in the flow passage to deliver fluid entering the lower portion thereof into the upper portion thereof, a lower gate mounted on the casing at each end of the flow passage to swing about a horizontal axis and open or close the lower portion of each end of the flow passage, an upper gate mounted on the casing at each end of the flow passage to open or close the upper portion of each end of the flow passage, and means carried by each lower gate and operable upon the opening thereof to hold an adjacent upper gate closed.

4. A reversible flow irrigation pump comprising a casing adapted to extend across an irrigation canal, said casing having a flow passage therethrough which aligns with the longitudinal axis of the canal, a lower gate mounted on the casing at each end of the flow passage to swing about an axis in spaced relation to the bottom of the canal and close the lower portion of the flow passage, an upper gate mounted on the casing above each lower gate to swing about an axis which lies parallel with and above the axis about which its respective lower gate swings, said upper gates being held by gravity in closing relation to the upper portions of the ends of the flow passage, an impeller in the flow passage to deliver fluid entering the lower portion thereof to the upper portion thereof and means to move the lower gates to control the direction of flow of fluid through the pump.

5. A reversible flow irrigation pump comprising a casing adapted to extend across an irrigation canal, said casing having a flow passage therethrough which aligns with the longitudinal axis of the canal, a lower gate mounted on the casing at each end of the flow passage to swing about an axis in spaced relation to the bottom of the canal and close the lower portion of the flow passage, an upper gate mounted on the casing above each lower gate to swing about an axis which lies parallel with and above the axis about which its respective lower gate swings, said upper gates being held by gravity in closing relation to the upper portions of the ends of the flow passage, an impeller in the flow passage to deliver fluid entering the lower portion thereof to the upper portion thereof, means to move the lower gates to control the direction of flow of fluid through the pump and means carried by each lower gate and operable upon the opening thereof positively to hold the upper gate immediately thereabove against opening.

HARRY M. ELLERKAMP.

REFERENCES CITED

The following references are of record in the file of this patent:

UNITED STATES PATENTS

| Number | Name | Date |
|---|---|---|
| 1,893,614 | Couch | Jan. 10, 1933 |
| 1,972,496 | Schlimbach | Sept. 4, 1934 |
| 2,209,652 | Johnsen | July 30, 1940 |
| 2,211,526 | Storey | Aug. 13, 1940 |
| 2,255,001 | Johnsen | Sept. 2, 1941 |